Patented Aug. 11, 1953

2,648,674

UNITED STATES PATENT OFFICE 2,648,674

COBALT PHTHALOCYANINE - ACETIC ACID AND CHLORINATED DERIVATIVES THEREOF

Fritz Muehlbauer, Ludwigshafen (Rhine), Germany

No Drawing. Application November 15, 1950, Serial No. 195,920. In Germany November 24, 1949

5 Claims. (Cl. 260—314.5)

The present invention relates to new dyestuffs of the phthalocyanine series and a process of producing them.

I have found that vat dyestuffs of the phthalocyanine series are obtained by reacting metal-free phthalocyanines or phthalocyanines of metals which may react in different oxidation degrees and are insoluble in aqueous alkali metal hydroxide solutions with halogenated lower saturated fatty acids under such conditions that the resulting dyestuffs are vattable in aqueous alkaline hyposulfite solutions but remain from difficultly soluble to insoluble in aqueous alkali metal hydroxide solutions.

Metals of the said kind are for example copper, iron, nickel, cobalt, chromium, molybdenum, bismuth, manganese and tin. The reaction is preferably carried out in the presence of a catalyst of the Friedel-Crafts type such as aluminum chloride or iron chloride and advantageously while using solid or liquid diluents.

Monochloro- or monobromacetic acid, chloroformic acid, dichloracetic acid, trichloracetic acid and halogenated propionic acids may be used for example as the halogenated aliphatic acids. They are allowed to act in such amounts that the dyestuffs formed are capable of being vatted, but remain from difficultly soluble to insoluble in aqueous alkali hydroxide solutions. It is usually sufficient to use 1 to 4 mols of halogenated aliphatic acid for each mol of metal phthalocyanine. Generally speaking, the process is carried out as follows:

The metal phthalocyanine is heated with the calculated amount of halogenated aliphatic acid in the presence of diluents, for example trichlorbenzene, and a small amount of a catalytically-acting substance for several hours at from 180° to 200° C. while stirring. After the reaction the mixture is diluted by the addition of further amounts of the originally employed diluent, the dyestuff is filtered off by suction, washed with methanol and the methanol removed by washing with water. The dyestuff is then boiled with dilute hydrochloric acid, filtered off by suction, washed with water until free from acid and dried.

An alternative method of separating the dyestuff is as follows:

When the reaction is completed, the mixture is allowed to cool to about 100° C. and the diluent, for instance trichlorbenzene, removed by blowing in steam. Then acid is added, the whole heated for some time, the dyestuff filtered off by suction, washed well with water and dried.

The dyestuffs obtainable according to this invention may be vatted by means of alkaline hyposulfite in the manner usual for vat dyestuffs. They dye cotton or viscose artificial silk from the vat clear shades having good fastness to light and washing.

The following examples will further illustrate the invention but the invention is not restricted to these examples. The parts are by weight.

Example 1

A mixture of 57 parts of cobalt phthalocyanine, 32 parts of trichloracetic acid, 200 parts of trichlorbenzene and 10 parts of sublimed ferric chloride is heated at 180° to 190° C. while stirring for 4 to 5 hours. The whole is then allowed to cool and the trichlorbenzene is removed by blowing in steam. After all the trichlorbenzene has passed over, the dyestuff is boiled with dilute hydrochloric acid, filtered off by suction, washed well with water and dried. 61 parts of a dark blue dyestuff are obtained which dyes cotton from a yellow-brown vat clear, blue shades of good fastness to light.

Example 2

A mixture of 57 parts of cobalt phthalocyanine, 64 parts of trichloracetic acid, 200 parts of trichlorbenzene and 15 parts of sublimed ferric chloride is heated at 180° to 190° C. while stirring vigorously for 4 to 5 hours. The dyestuff is worked up as described in Example 1. The yield amounts to about 61 parts of a dark brown powder which dyes cotton or viscose artificial silk from a dark brown vat greenish blue shades.

Example 3

A mixture of 57 parts of copper phthalocyanine, 96 parts of trichloracetic acid, 200 parts of trichlorbenzene and 15 parts of anhydrous aluminum chloride is heated about 5 hours at 180° to 190° C. while stirring. The dyestuff is worked up as described in Example 1. There are obtained 65 parts of a dark blue powder, which dyes vegetable fibers from a violet vat greenish blue shades.

Instead of trichloracetic acid, for example trichlorpropionic acid or trichlorlactic acid may be used. There are obtained phthalocyanines which dye cotton from the vat greenish blue shades of good fastness to light.

Example 4

A mixture of 57 parts of cobalt phthalocyanine, 40 parts of monochloracetic acid, 15 parts of anhydrous ferric chloride and 200 parts of trichlorbenzene is heated for 4 to 5 hours at 180° to 190° C. while stirring well. The trichlorbenzene is then removed by filtration and the remaining dyestuff washed with methanol and water. In order to remove the ferric chloride and any other impurities, the dyestuff is boiled well with dilute hydrochloric acid, filtered off by suction, washed with water and dried. About 60 parts of a dark blue dyestuff powder are thus obtained which can be vatted. In order to increase the strength of the dyestuff as far as possible it may be dissolved at room temperature in 500 parts of concentrated sulfuric acid, the solution poured into 5000 parts of water and the precipitated dyestuff filtered off by suction and washed well with water. The dyestuff is then made into a paste of about 20 to 25 per cent strength with an addition of 2 to 3 per cent of a dispersing agent. The dyestuff dyes cotton from a yellow-brown vat powerful navy blue shades.

What I claim is:

1. Vat dyestuffs of the phthalocyanine series of the general formula

Ph—(R—COOH)$_n$ wherein Ph stands for a cobalt phthalocyanine radical, R for an aliphatic radical selected from the class consisting of

and $n$ for a number from 1 to 4, said dyes being vattable in alkaline hyposulfite solution but substantially insoluble in aqueous alkali metal hydroxide solutions.

2. The vat dyestuff of the formula

Ph—CH$_2$.COOH wherein Ph stands for the radical of the cobalt phthalocyanine, said dyes being vattable in alkaline hyposulfite solution but substantially insoluble in aqueous alkali metal hydroxide solutions.

3. The vat dyestuff of the formula

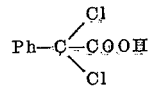

wherein Ph stands for the radical of the cobalt phthalocyanine, said dyes being vattable in alkaline hyposulfite solution but substantially insoluble in aqueous alkali metal hydroxide solutions.

4. The vat dyestuff of the formula

Ph—(CH$_2$.COOH)$_2$ wherein Ph stands for the radical of the cobalt phthalocyanine, said dyes being vattable in alkaline hyposulfite solution but substantially insoluble in aqueous alkali metal hydroxide solutions.

5. The vat dyestuff of the formula

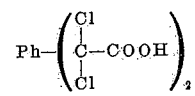

wherein Ph stands for the radical of the cobalt phthalocyanine, said dyes being vattable in alkaline hyposulfite solution but substantially insoluble in aqueous alkali metal hydroxide solutions.

FRITZ MUEHLBAUER.

References Cited in the file of this patent

FOREIGN PATENTS

| Number | Country | Date |
|---|---|---|
| 487,261 | Great Britain | June 17, 1938 |
| 496,970 | Great Britain | Dec. 9, 1938 |
| 510,901 | Great Britain | Aug. 10, 1939 |